US 12,272,351 B2

(12) United States Patent
Abid et al.

(10) Patent No.: US 12,272,351 B2
(45) Date of Patent: Apr. 8, 2025

(54) AUTOMATIC OUT OF VOCABULARY WORD DETECTION IN SPEECH RECOGNITION

(71) Applicant: Cisco Technology, Inc., San Jose, CA (US)

(72) Inventors: Mohamed Malek Abid, Waterloo (CA); Erwan Barry Tarik Zerhouni, Zürich (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 293 days.

(21) Appl. No.: 17/679,324

(22) Filed: Feb. 24, 2022

(65) Prior Publication Data

US 2023/0267918 A1    Aug. 24, 2023

(51) Int. Cl.
*G10L 15/08*    (2006.01)
*G10L 15/02*    (2006.01)
*G10L 15/06*    (2013.01)

(52) U.S. Cl.
CPC ............ *G10L 15/08* (2013.01); *G10L 15/02* (2013.01); *G10L 15/063* (2013.01); *G10L 2015/025* (2013.01); *G10L 2015/088* (2013.01)

(58) Field of Classification Search
CPC ... G10L 15/08; G10L 15/02; G10L 2015/025; G10L 2015/088
See application file for complete search history.

(56) References Cited

U.S. PATENT DOCUMENTS

| 10,242,662 | B1* | 3/2019 | Cherepanov ............ G10L 15/01 |
| 11,650,986 | B1* | 5/2023 | Agbemabiese ... G06F 16/24553 707/737 |
| 2003/0187643 | A1 | 10/2003 | Van Thong et al. |
| 2005/0159949 | A1* | 7/2005 | Yu ......................... G10L 15/065 704/235 |
| 2008/0140398 | A1* | 6/2008 | Shpigel .................. G10L 15/26 704/E15.04 |

(Continued)

OTHER PUBLICATIONS

Kim, Replacing Out-of-Vocabulary Words with an Appropriate Synonym Based on Word2VnCR, 2021, Hindawi, whole document (Year: 2021).*

(Continued)

*Primary Examiner* — Sonia L Gay
(74) *Attorney, Agent, or Firm* — Edell, Shapiro & Finnan, LLC

(57) ABSTRACT

Presented herein are systems and methods are presented for detecting out-of-vocabulary (OOV) words in an automatic speech recognition (ASR) system, determining an intended word for the OOV, and adding the intended word to a repository of words. A method may involve receiving audio input data including a series of spoken words; determining that one of the spoken words is an out of vocabulary word absent from a repository of words; generating word candidates based on characteristics of the out of vocabulary word; presenting the word candidates on a display; receiving intended word input data that indicates a selection of one of the word candidates as an intended word for the out of vocabulary word; and adding the intended word to the repository of words. Additionally, one or more devices or apparatuses may be configured to perform such method.

20 Claims, 5 Drawing Sheets

(56) References Cited

U.S. PATENT DOCUMENTS

| | | | |
|---|---|---|---|
| 2009/0112593 A1* | 4/2009 | Konig | G10L 15/26 704/251 |
| 2012/0284306 A1* | 11/2012 | Minnich | G06F 16/374 707/E17.014 |
| 2018/0157664 A1* | 6/2018 | Howell | G06F 16/24578 |
| 2020/0050678 A1* | 2/2020 | McNeela | G06F 16/9024 |
| 2020/0058294 A1 | 2/2020 | Ahn et al. | |
| 2021/0343274 A1 | 11/2021 | Kang et al. | |

OTHER PUBLICATIONS

Wang, Learning Word Embedding with Domain Awareness, 2019, arXiv, whole document (Year: 2019).*

Decadt, Transcription of Out-of-Vocabulary Words in Large Vocabulary Speech Recognition Based on Phoneme-to-Grapheme Conversion, 2002, IEEE, whole document (Year: 2002).*

Xiaohui Zhang et al., "OOV Recovery With Efficient 2nd Pass Decoding and Open-Vocabulary Word-Level RNNLM Rescoring for Hybrid ASR", IEEE ICASSP 2020, 10.1109/ICASSP40776. 2020.9053872, May 2020, 5 pages.

Long Qin, "Learning Out-of-Vocabulary Words in Automatic Speech Recognition", Doctoral Dissertation, Carnegie Mellon University, 2013, 111 pages.

Pieter Fivez et al., "Unsupervised Context-Sensitive Spelling Correction of English and Dutch Clinical Free-Text with Word and Character N-Gram Embeddings", arXiv:1710.07045v1 [cs.CL], Oct. 19, 2017, 14 pages.

Bart Decadt et al., "Memory-Based Phoneme-to-Grapheme Conversion", Proceedings CLIN 2001, 47-61, Rodopi, Jan. 2002, 15 pages.

Imran Sheikh et al., "Learning to Retrieve Out-of-Vocabulary Words in Speech Recognition", arXiv:1511.05389v4 [cs.CL], Mar. 1, 2016, 14 pages.

Kaldi, "Lattices in Kaldi", 15 pages, retrieved from Internet Feb. 23, 2022; https://kaldi-asr.org/doc/lattices.html.

Ekaterina Egorova et al., "Out-of-Vocabulary Word Recovery Using FST-Based Subword Unit Clustering in a Hybrid ASR System", IEEE ICASSP 2018, Apr. 2018, 10.1109/ICASSP.2018.8462221, 5 pages.

Dogan Can, "Lattice Indexing for Spoken Term Detection", IEEE Transactions on Audio, Speech, and Language Processing, vol. 19, No. 8, Nov. 2011, 10 pages.

Kyubyong Park et al., "g2pE: a Simple Python Module for English Grapheme to Phoneme Conversion", Github, Dec. 31, 2019, 7 pages.

Nagendra Kumar Goel et al., "Low Cost Lexicon", retrieved from Internet Feb. 23, 2022, 27 pages; http://www.danielpovey.com/files/jhu09/7_Goel_Thomas_Akyazi_Lexicon.pdf?attredirects=0.

Piotr Bojanowski et al., "EnrichingWord Vectors with Subword Information", arXiv:1607.04606v2 [cs.CL], Jun. 19, 2017, 12 pages.

Armand Joulin et al., "Bag of Tricks for Efficient Text Classification", arXiv:1607.01759v3 [cs.CL], Aug. 9, 2016, 5 pages.

* cited by examiner

AUTOMATIC OUT OF VOCABULARY WORD DETECTION IN SPEECH RECOGNITION

TECHNICAL FIELD

The present disclosure relates to systems and methods for the automatic detection of out of vocabulary words in an automatic speech recognition system.

BACKGROUND

Automatic Speech Recognition (ASR) generally relates to methods and systems that enable the recognition and translation of spoken language into text. Such speech recognition systems may be used, e.g., in the transcription of meetings. The speech recognition system may use or create a database or repository of recognized words, and may have or create pronunciations associated with each of the recognized words. Out of Vocabulary (OOV) words are words in a natural language environment that do not exist in the database or repository of recognized words. OOV words may include, e.g., company or product names, peoples' names, and/or geographic places. Existing speech recognition technology suffers from a problem of efficiently detecting and addressing OOV words.

DESCRIPTION OF EXAMPLE EMBODIMENTS

Overview

Figure 1:
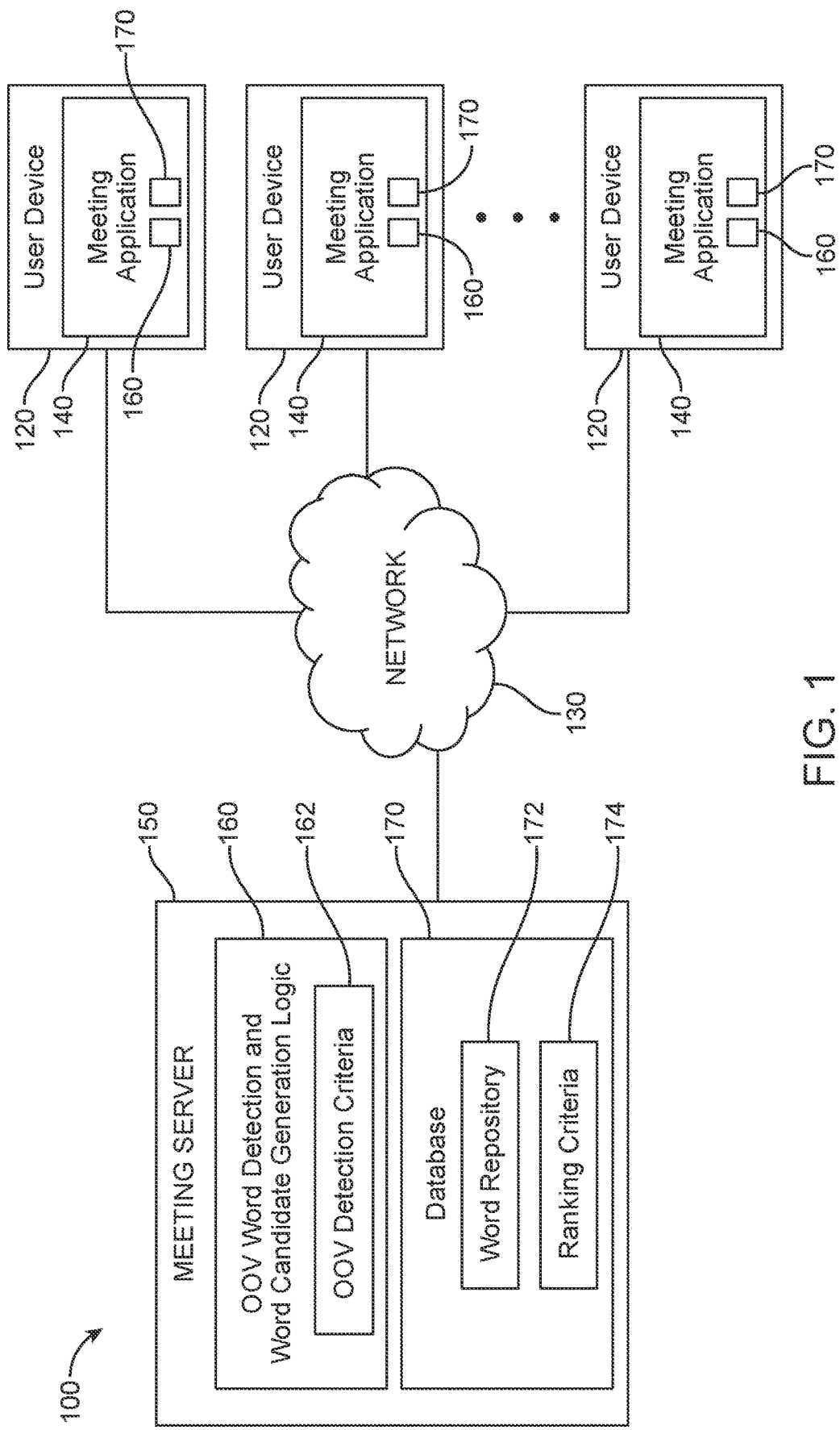
FIG. 1 is a high level diagram of a system including user devices hosting, e.g., meeting applications, and a meeting server that hosts OOV word detection and word candidate generation logic, according to an example embodiment.

Presented herein are systems and methods for detecting out-of-vocabulary (OOV) words in an automatic speech recognition (ASR) system. A method includes determining an intended word for the OOV, and adding the intended word to a repository of words. The method may involve receiving audio input data including a series of spoken words, determining that one of the spoken words is an out of vocabulary word absent from a repository of words, and generating word candidates based on characteristics of the out of vocabulary word. The method may further involve presenting the word candidates on a display, receiving intended word input data that indicates a selection of one of the word candidates as an intended word for the out of vocabulary word, and adding the intended word to the repository of words.

In another embodiment, a device is provided. The device includes an interface configured to enable network communications, a memory, and one or more processors coupled to the interface and the memory, and configured to: receive audio input data including a series of spoken words, determine that one of the spoken words is an out of vocabulary word absent from a repository of words, generate word candidates based on characteristics of the out of vocabulary word, present the word candidates on a display, receive intended word input data that indicates a selection of one of the word candidates as an intended word for the out of vocabulary word, and add the intended word to the repository of words.

In yet another embodiment, one or more non-transitory computer readable storage media may be encoded with instructions that, when executed by a processor, cause the processor to determine an intended word for an OOV, and add the intended word to a repository of words. When executing the instructions, the processor may receive audio input data including a series of spoken words, determine that one of the spoken words is an out of vocabulary word absent from a repository of words, and generate word candidates based on characteristics of the out of vocabulary word. Additionally, when executing the instructions, the processor may further present the word candidates on a display, receive intended word input data that indicates a selection of one of the word candidates as an intended word for the out of vocabulary word, and add the intended word to the repository of words.

Example Embodiments

As noted above, existing speech recognition technology suffers from a problem of being able to efficiently detect and address OOV words, e.g., when generating a transcript of a meeting. OOV words may arise, e.g., when a meeting participant speaks an unrecognized proper noun (such as the name of an individual, a company, or an organization). A word may be detected as an OOV word when, e.g., a meeting participant, who may be a native or non-native speaker, mispronounces a particular word or speaks a particular word with an accent.

According to aspects of the present disclosure, systems and methods are presented that enhance one or more users' meeting transcriptions and closed captions by detecting an OOV word in an ASR system, and generating potential candidate words for the OOV words based on, e.g., context and predefined ranking criteria.

The system may further be configured to facilitate the presentation of the word candidates on a display. The word candidates may be presented in a ranked order within a transcript. In one possible implementation, the presentation may take the form of a pull down menu or the like. The system may be configured to receive user input that indicates a selection of a presented word candidate as an intended word, and the intended word may then be added to a database or repository of recognized words.

The database or repository of recognized words may be unique to a specific individual, group of individuals, company, or organization (hereinafter a "specific entity"). The specific entity may frequently use particular language or jargon during their meetings. As more and more OOV words are added over time to the specific entity's word repository, the systems and methods herein may progressively provide more and more accurate detection and transcription of the specific entity's meetings. Further, even if one or more people within or involved in meetings with the specific entity mispronounce certain words or say certain words with an accent, the systems and methods described herein may provide an enhanced meeting experience for the specific entity by detecting and providing a corrected or accurate transcription of the mispronounced or accented spoken words.

FIG. 1 is a high level diagram of a system including user devices hosting, e.g., meeting applications, and a meeting server that hosts OOV word detection and word candidate generation logic, according to an example embodiment. The system 100 includes a meeting server 150 and a plurality of user devices 120 that communicate with meeting server 150 via a network 130. While the meeting server 150 is generally described as being one server, the meeting server 150 may be implemented by a plurality of servers. The meeting server 150 may be configured to provide an online meeting service for hosting a communication session among user devices 120. The meeting server 150 and/or one or more of the user devices 120 may be configured to detect an OOV word in an ASR system and generate one or more potential candidate words for the OOV word, as further described below with reference to FIG. 2.

The user devices 120 may be tablets, laptop computers, desktop computers, Smartphones, virtual desktop clients, video conference endpoints, or any user device now known or hereinafter developed that can run a meeting client, such as a meeting application 140, or similar communication functionality. The user devices 120 may have a dedicated physical keyboard or touch-screen capabilities to provide a virtual on-screen keyboard to enter text. The network 130 may include wired local and wide-area networks as well as wireless local and wide-area networks. The user devices 120 may also have short-range wireless system connectivity (such as Bluetooth™ wireless system capability, ultrasound communication capability, etc.) to enable local wireless connectivity with a videoconference endpoint in a meeting room or with other user devices in the same meeting room.

Figure 2:
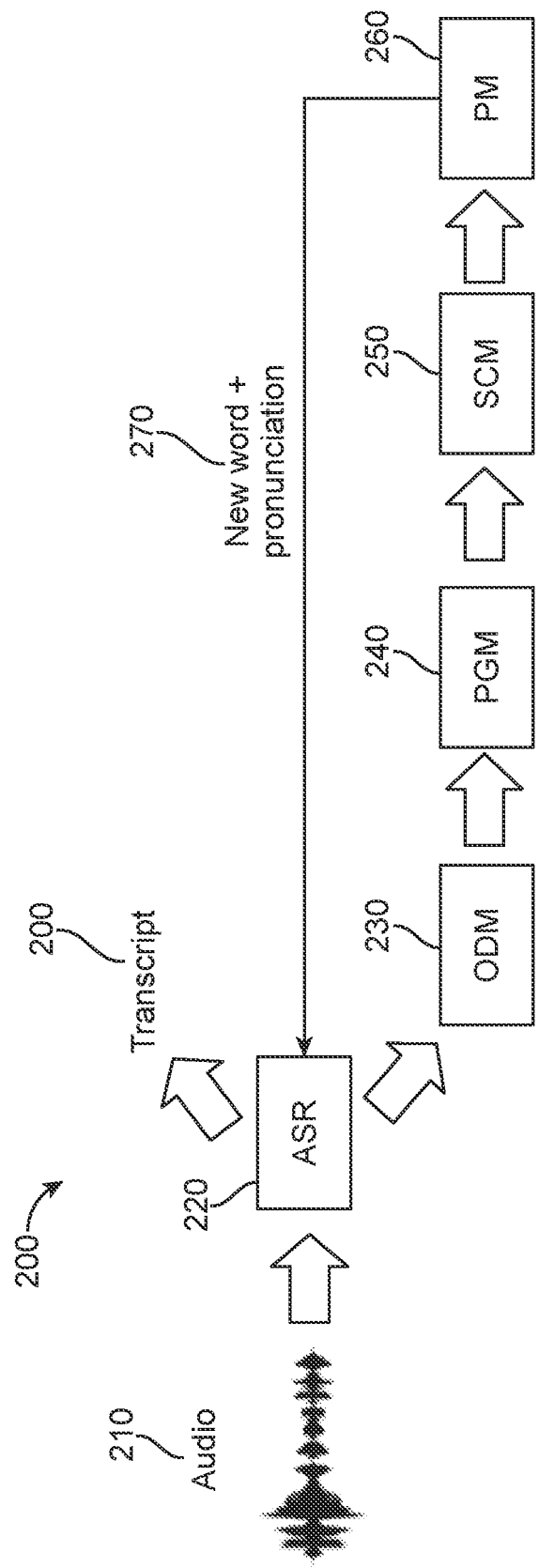
FIG. 2 is a block diagram showing a general flow of OOV word detection and word candidate generation logic, according to an example embodiment.

As discussed further with respect to FIG. 2, a meeting application 140 may be configured to receive and process audio data, which may include spoken words from an input audio signal. For example, meeting application 140 may be configured to generate audio data from audio signals input at one or more microphones (not shown) coupled to each of the user devices 120. The meeting application 140 may transmit the generated audio data to the meeting server 150 via network 130. The meeting application 140 may further be configured to receive or generate video data from video signals input at one or more cameras (not shown) coupled to the user devices 120.

The meeting application 140 may be configured to partially or entirely detect and transcribe spoken words from the received or generated audio data. Further, the detection and transcription of spoken words may be partially or entirely performed by the meeting server 150, which may receive audio data transmitted from one or more meeting application 140. Thus, a given meeting application 140 and/or meeting server 150 may use ASR techniques to detect and transcribe the spoken words, and the audio data transmitted from the meeting application 140 to the meeting server 150 may or may not include transcription data. An embodiment in which the meeting server 150 performs some or all of the transcription may be implemented where processing or computing resources are limited on one or more of the user devices 120. However, an embodiment in which the user devices 120 perform some or all of the transcription may be implemented, e.g., to provide "real-time" close captioning during a meeting, which may enable a faster display of a transcription without a delay arising from the transmission of audio data to the meeting server 150, the performance and transmission of transcription by the meeting server 150, and the receipt of the transcription at the user devices 120.

The meeting server 150 may include OOV word detection and word candidate generation logic 160 and a database 170. The OOV word detection and word candidate generation logic 160 may include OOV detection criteria 162. The database 170 may include at least one word repository 172 and OOV ranking criteria 174. The OOV word detection and word candidate generation logic 160 may be configured to use the word repository 172 (or word repositories 172), ranking criteria 174, and OOV detection criteria 162 to detect at least one OOV word and generate one or more word candidates corresponding to each detected OOV word.

After the OOV word detection and word candidate generation logic 160 detects an OOV word and generates word candidates corresponding to the detected OOV word, the meeting server 150 may be configured to communicate the word candidates to the meeting applications 140 of the user devices 120. In an embodiment in which the meeting server 150 generates a transcript of spoken words, the meeting server 150 may be configured to transmit the transcript, an indication of the words in the transcript that are detected as OOV word(s), and the word candidate(s) corresponding to the detected OOV words to the user devices 120. In an embodiment in which the user devices 120 are configured to generate and transmit a transcript of spoken words to the meeting server 150, the meeting server 150 may not transmit a comprehensive transcript to the user devices 120; but instead, the meeting server 150 may be configured to transmit an indication of which words in the received transcript were detected as detected OOV words and the generated word candidate(s) corresponding to the detected OOV words.

Figure 3:
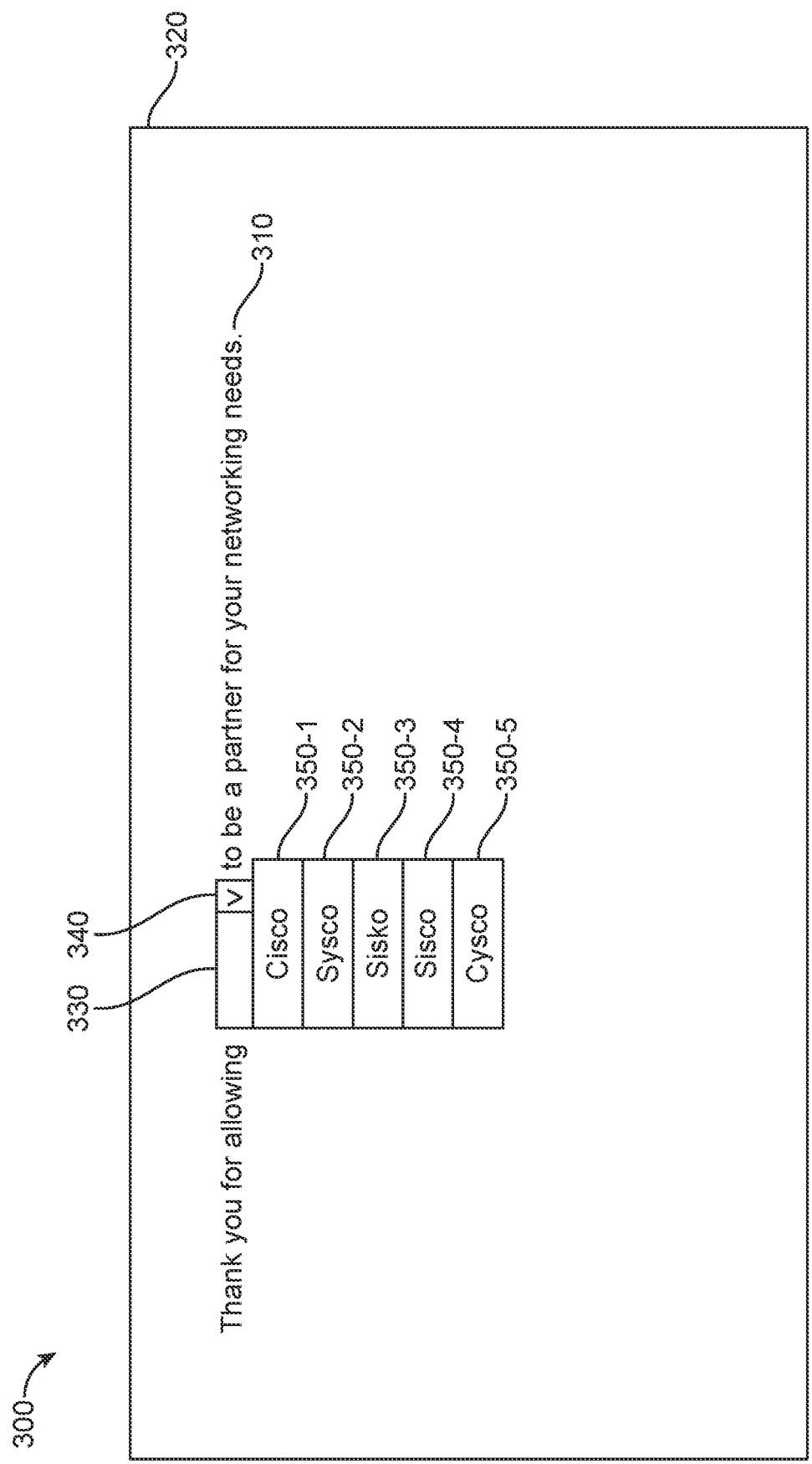
FIG. 3 shows an example of a user interface that presents a transcript along with proposed word candidates, according to an example embodiment.

As further discussed with respect to FIG. 3, the meeting applications 140 may be configured to facilitate the display of a detected OOV word and its corresponding word candidate(s); receive intended word input data that indicates a selection of one of the word candidates as an intended word for the OOV word; and transmit an indication of the intended word to the meeting server 150. The meeting server 150 is configured to receive the indication of the intended word and add the intended word in the word repository 172.

In addition to communicating the detected OOV word(s) and corresponding word candidate(s), the meeting server 150 and/or meeting applications 140 may be configured to generate pronunciation data of the detected and transcribed spoken words from the received or generated audio data. The meeting server 150 and/or meeting applications 140 may further be configured to associate a generated pronunciation with a detected OOV word, the generated word candidate(s), and/or an intended word. In one embodiment, an OOV is detected by the OOV Detection Module (ODM) logic and passed onto to the Phoneme-to-Grapheme (P2G) model, producing potential word candidates for the OOV. Further, the word candidate may be the result of word candidate generation logic, and an intended word may be a word that is validated or altered via received user input data. An intended word and associated pronunciation data may be stored in the word repository 172 such that a future detection of a spoken word having pronunciation data consistent with the pronunciation data stored in the word repository 172 may be accurately transcribed as the intended word.

In one embodiment, the OOV word detection and word candidate generation logic 160 and database 170 may be included in any of meeting applications 140, and thus any of the user devices 120 may, alone or in combination with the meeting server 150, be configured to perform the methods described herein.

At a high level, the systems, methods, and techniques discussed herein may be used to personalize the user experience of a user of a specific entity using a meeting application. The approach may, for example, improve the accuracy of ASR models and correct words in a meeting transcript. In one possible embodiment, joint word level and character N-gram embeddings may be used to capture a semantic meaning of words in a given dataset, and thus the OOV detection solution may be context sensitive. Joint word-level and character-level N-gram embeddings may be learned, which may allow for an OOV word to be corrected. The correction of an OOV word may include correcting the spelling of the OOV word in an autocorrection step. The correction may further correct the spelling to an OOV word or a word included in the given dataset. In one embodiment, the correction may include correcting the spelling to an in-vocabulary word in the ASR model lexicon or an OOV word sourced from the joint word-level and character-level N-gram embeddings from a given dataset.

OOV word detection and word candidate generation logic 160 may generate pronunciations for captured words. The pronunciations for captured words may be analyzed using phonemes extracted from audio data and their corresponding lattices. Word candidates may be synthesized and ranked using at least one ranking criterion out of ranking criteria 174. One ranking criterion may be, for example, word embeddings such as character level N-gram embeddings. Word embeddings may be used to provide information that may be used to automatically detect and/or filter relevant words, names, and typographical errors. Alternative pronunciations may also generated. The alternative pronunciations may be one of the ranking criteria 174, or the alternative pronunciations may be used by one or more of the ranking criteria 174. The word candidates may be ranked, and any typographical errors in the dataset may be corrected for any words in the dataset that are determined as misspelled.

OOV word detection and word candidate generation logic 160 may receive user input that indicates which of the word candidates corresponding to the detected OOV word is the intended word. The user may interact with an input device (e.g., touch-screen display, mouse, or keyboard) to select one of the word candidates as the intended word. That is, one or more word candidates may be displayed, and a user may validate a word candidate as being the word that the user intended to speak. The intended word may then be added to a lexicon (e.g., a word repository 172). A pronunciation associated with the intended word may also be added to the lexicon. Accordingly, a user's online meeting experience may be enhanced with accurate and real-time transcriptions of words spoken during a meeting.

In an embodiment, and incorporated into OOV word detection and word candidate generation logic 160, autocorrection logic may include at least one of automatic verification or automatic correction of misspelled or invalid OOV words within a given context. As noted above, the misspelled or invalid OOV words may be unique for a specific entity. Such automatic verification and/or correction may increase accuracy and efficiency of the ASR system. A large lexicon that contains all possible words may negatively impact the speed of an ASR system, e.g., in the real-time transcription of an online meeting. The autocorrection approach of OOV word detection and word candidate generation logic 160 may rectify this inefficiency and enable low-latency between a user speaking and the user's transcriptions being displayed in closed caption by, e.g., using a context-based analysis to customize the lexicon's vocabulary for a given specific entity. This customized lexicon vocabulary may be achieved by adding OOV terms or words using the methods described herein, which enables the ASR system to recognize specific language and jargon that may be used in the specific entity's meetings.

In accordance with an embodiment, a context-sensitive OOV detection solution is provided by OOV word detection and word candidate generation logic 160 and may include four main components. The first component may be configured to detect potential OOV words. The second component may be configured to generate potential word candidates to which a given potential OOV word may be corrected. The third component may be configured to rank each candidate, which may include scoring each candidate based on one or more of plurality of ranking factors. The fourth component may be configured to generate possible pronunciations where possible pronunciations of the words are synthesized using a Grapheme-to-Phoneme model and its corresponding audio. A user may then validate the word candidates as intended words, and the intended words may be added or appended to the lexicon with their corresponding pronunciations. The OOV word detection and word candidate generation logic 160 may enable the ASR to efficiently recognize and transcribe the added or appended intended words in future meetings for a given specific entity.

FIG. 2 is a block diagram showing a general flow of OOV word detection and word candidate generation logic 160, according to an example embodiment. As shown in FIG. 2, in an OOV word detection system 200, an input audio signal 210 is captured and used as input to an ASR 220. The ASR 220 may be configured to generate a transcript and may be configured to provide information associated with the input audio data to an OOV word detection module (ODM) 230. In one embodiment, the ASR 220 is configured to generate a series of words, which may be referred to as spoken content, from the captured audio signal, and provide the same to the ODM 230. The ODM 230 may be configured to detect OOV words in the series of detected spoken words associated with the input audio. The ODM may detect OOV words by comparing each word associated with the audio input with a pre-defined lexicon, which may contain approximately 125,000 words. If a word associated with the audio input does not match any word in the pre-defined lexicon, the word may be determined to be an OOV word. The ODM 230 may then communicate the OOV words to a Phoneme-to-Grapheme Module (PGM) 240.

The PGM 240 may use lattices, such as Kaldi lattices, to derive a phoneme representation for each OOV word received from the ODM 230. Further, the PGM 240 may generate grapheme candidates for each OOV word received from the ODM 230. In one embodiment, the phoneme sequences corresponding to potential pronunciations for a given OOV word candidate generated from the lattices may be extracted by, first, initializing a decoder with a weighted finite-state transducer (WFST). When traversed down a certain path, the WFST yields a potential subgraph of phonemes and joint probabilities of that path in the context of the lattice's audio data. To efficiently decode these lattices using the WFST, the lattices are reverse-indexed before decoding. The decoding step concludes with the generation of multiple potential OOV candidate lattices for a given audio lattice, and information associated with the PGM 240 is provided to a Spell Checker Module (SCM) 250.

The SCM 250 may receive a list of potential graphemes for a given spoken content as input, and may output a list of word candidates. In one embodiment, first, a machine learning (ML) spell checking module is trained. The ML spell checking module may be trained by extracting word- and character-level embeddings from a given data set with a joint word level and character N-gram ML model. The model may be trained using a large corpus of transcribed audio or a sufficiently large corpus of text from a domain related to the use-case. For example, if a domain relates to a specific entity, which is a corporation, previous corporate meetings of the corporation may be used. The model may learn the semantic contexts of specific words that appear in the domain and represent them as N-dimensional vectors. A combination of word embeddings and character N-gram embeddings may yield accurate results for a word's context, even when the word of interest is an OOV word. The SCM 250 may pre-process the data before training the model. In one embodiment, the SCM 250 uses custom functions to normalize the data for training. Prior to training the model, e.g., the SCM 250 may remove numbers, punctuation, acronyms, laughs, pauses, and stutters.

In one embodiment, the SCM 250 may use a library, such as fastText, an open-source, lightweight library that allows users to learn text representations and text classifiers, to learn word embeddings and text classification, but the SCM 250 may be optimized using specific parameters or settings. For example, instead of using the fastText default vector dimensionality parameter of N=300, the SCM 250 may be configured to use the fastText vector dimensionality parameter N=150, and/or enable a skip-gram training algorithm option, which may enable better performance in the vectorizing of new or rarely occurring words in the corpus, as compared to the performance using fastText default parameters. A modified vector dimensionality may decrease the time required to train a new model at run-time for a novel context without negatively impacting the embedding quality.

A training algorithm, such as the Continuous Bag of Words (CBOW) training algorithm, may be used to predict a word based on the context during the model training and may average similar word vectors in the process. A skip-gram approach may be used to predict context based on a word. The SCM 250 may use a model, such as a the skip-gram approach, to accurately capture the context of infrequent OOV; the model, such as the skip-gram approach, may use a "smoothing" effect that a CBOW will apply as it averages less frequent word vectors with more frequent word vectors.

The SCM 250 may use additional custom parameters that are specified for a specific domain. For example, the SCM 250 may use a window size of 5; 15 epochs for training; and a minimum count of 5, which may prevent words in a corpus with fewer than 5 total occurrences from being embedded.

The SCM 250 may use a ML spell checking model to produce similar words with assigned probabilities that may correlate to the similarity from at least one of a semantic context or a spelling/morphology perspective. If each word is represented as a vector, the inference procedure to analyze the context of a word may involve calculating a cosine distance between a given token and the vectors learned by the model; the inference procedure may then determine and use the most similar results. In the use of word-level embeddings, a model may be incapable of computing similar words if the given token is OOV; however, some models, such as one using fastText, may take incorrectly spelled or OOV tokens as input and may output accurate-similar words from at least one of the semantic context or the spelling/morphological perspective in a given context.

The SCM 250 may generate a list of potential corrections for a given flagged OOV word; which may be attributed to the context-sensitive component of the word level embedding procedure. OOV terms, such as closely spelled product/company names found in the relevant dataset, may be appended to the list of candidate words. The list of candidate words may be ranked and considered as follows:

If the OOV word is less than four characters, an edit distance limit of 1 character is set. Otherwise, the edit distance limit is set to 2 characters.

If a candidate's similarity probability from a model, such as a model using fastText, exceeds a predetermined threshold, a point may be added to a score.

If the candidate word length is within 3 characters of the OOV, a point may be added to the score.

If the candidate starts with the same character as the OOV, a point may be added to the score.

If the edit distance between the OOV and the candidate is less than or equal to an edit distance threshold, a point may be added to the score.

If the OOV's approximate pronunciation, which may be computed with, e.g., a DoubleMetaphone algorithm, matches the candidate's determined pronunciation, a point may be added to the score.

Once the above-noted calculations are complete, a highest-scoring candidate may be selected as the potential correct OOV grapheme. In one embodiment, only a highest-scoring candidate that has a score above a predetermined threshold is selected. The above-noted algorithm may be applied to every potential grapheme generated by the PGM 240 for a given spoken context. In one embodiment, a grapheme that is determined to be the most frequently occurring grapheme may be selected and presented to the end-user as the potential grapheme for the OOV spoken content.

Using the above-noted techniques, the SCM 250 may receive as an input a misspelled or mispronounced word and subsequently output a correctly spelled word. In other words, the SCM 250 may be configured to correct spelling errors, even for OOV words.

The last component shown in FIG. 2 is the Pronunciation Module (PM) 260. In one embodiment, a user may validate a proposed OOV grapheme in accordance with the methods presented herein, and the PM 260 may generate candidate pronunciations, which correspond to the user-validated proposed OOV grapheme, using at least one of a Grapheme-to-Phoneme model or a flagged spoken content. In one embodiment, first, the pronunciation candidate is generated using a Grapheme-to-Phoneme library, which may predict phonemes using a neural network. Second, the PM 260 may use the given audio data to estimate a likelihood of each pronunciation candidate. Third, the new word with a pronunciation 270 having the highest estimated likelihood may be selected and may be added to the lexicon, i.e., word repository 172.

The above-noted techniques may thus be capable of detecting and correcting, e.g., typographical errors in OOV words. This capability is particularly beneficial for OOV words that are product names, company names, etc. Such capabilities may cure deficiencies of previously employed techniques, which may be unable to distinguish between two similar terms that are, e.g., not in the language of the lexicon or not found in dictionaries of the language of the lexicon.

The above-noted automatic OOV detection techniques of OOV word detection and word candidate generation logic 160 may capture the correct spelling of a word using the context-sensitive embeddings, correct the typos to the correct spelling, and synthesize an artificial pronunciation for the word using the audio data, lattices, and the Grapheme-to-Phoneme model. Another advantage of the above-noted techniques is an ability to be language-independent. Specifically, in one embodiment, since the context-sensitive candidate generation relies on word- and character-level N-gram embeddings to detect correct words, the automatic OOV detection can be transferred or applied to a wide variety of languages, which may be analyzed and extracted, e.g., with fastText embeddings.

The synthesis of alternative pronunciations for captured words may also contribute to the personalization of the user's closed captions. In particular, the synthesis of alternative pronunciations may be applied, not only to OOV words, but also to frequent words that are found in the ASR lexicon, i.e., word repository 172. Thus, the synthesis of alternative pronunciations offers accurate transcriptions of words spoken by users having non-native accents or users who speak using alternative pronunciations. Accordingly, an enhanced online meeting is provided, especially for specific users that may conduct a multitude of meetings in or with a specific entity.

Thus, as those skilled in the art will appreciate, the above-noted techniques enable the correction of spelling errors and the addition of OOV words into an ASR, and the above-noted techniques may be particularly beneficial for a specific user/organization that conducts meetings involving particularized language including but not limited to project names, company names, and acronyms.

FIG. 3 shows an example of a user interface 300 configured to present a transcript 310, which may include proposed word candidates 350-1, 350-2, 350-3, 350-4, 350-5 on a display 320, according to an example embodiment. The display 320 may be a display of a user device 120, and the meeting application 140 and/or meeting server 150 may be configured to receive audio data corresponding to a meeting and use the above-described ASR techniques to generate the transcript 310, which may include a series of spoken words. Further, the meeting application 140 and/or meeting server 150 may be configured to detect OOV words in the generated transcript 310 using the above-described OOV word detection techniques. In one embodiment, the detected OOV word is replaced with a dropdown menu 330, or the like, which may be configured to display a plurality of potential word candidates 350-1, 350-2, 350-3, 350-4, 350-5, which may be ranked using one or more of the above-described ranking criteria. The dropdown menu 330 may include a dropdown button 340, which when selected by a user via interaction with a user input device, is configured to show the word candidates 350-1, 350-2, 350-3, 350-4, 350-5. In the alternative to or in addition to a dropdown menu 330, the highest ranked word candidate of the proposed word candidates 350-1, 350-2, 350-3, 350-4, 350-5 may be included in the transcript 310 in the location in the series of words where the corresponding OOV word is detected.

In the example shown in FIG. 3, the transcript 310 includes the words "[t]hank you for allowing," followed by a detected OOV word, and then followed by the words "to be a partner for your networking needs." Also, the dropdown menu 330 includes five word candidates 350-1, 350-2, 350-3, 350-4, 350-5, namely, "Cisco", "Sysco", "Sisko", "Sisco", and "Cysco", respectively, which are respectively ranked in the order from top to bottom of highest ranking word candidate to lowest ranking word candidate. While five word candidates are displayed in the embodiment shown, there may be any number of word candidates displayed. Thus the number of word candidates displayed is not limited and may depend on the amount of word candidates generated by the OOV word detection and word candidate generation logic 160.

The user interface 300 is configured to interact with a user input device such that the user may select or indicate one of the word candidates 350-1, 350-2, 350-3, 350-4, 350-5 as an intended word. That is, the meeting application 140 may be configured to receive user input data that indicates which of the displayed word candidates 350-1, 350-2, 350-3, 350-4, 350-5 the user has selected or indicated as the correct word out of the word candidates 350-1, 350-2, 350-3, 350-4, 350-5. Upon receiving the input user data, the transcript 310 may be modified such that the intended word replaces dropdown menu 330 or highest ranked word candidate. Additionally, the intended word may be added to the ASR system such that subsequent detections of the added intended word are recognized and accurately included in the transcript 310. In the embodiment shown in FIG. 3, the user may select or indicate that the "Cisco" is the intended word, and the system may add "Cisco" to the lexicon or word repository 172 of the ASR system for that particular user, meeting participants, or organization.

Figure 4:
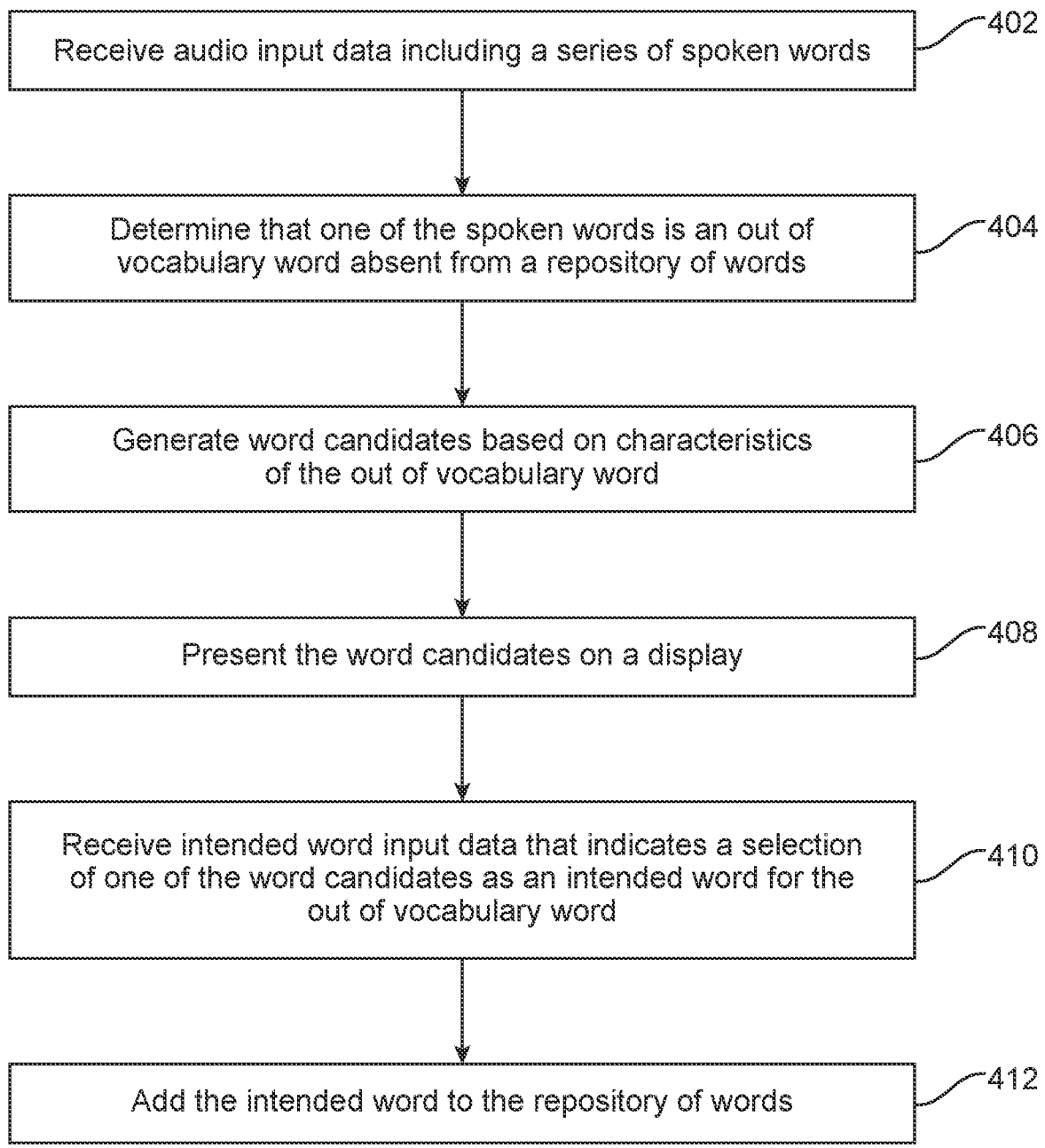
FIG. 4 is a flow chart depicting a series of operations for executing OOV word detection and word candidate generation logic, according to an example embodiment.

FIG. 4 is a flow chart depicting a series of operations for executing OOV word detection and word candidate generation logic, according to an example embodiment. In accordance with this embodiment, at 402, an operation is configured to receive audio input data including a series of spoken words. At 404, an operation is configured to determine that one of the spoken words is an out of vocabulary word absent from a repository of words. At 406, an operation is configured to generate word candidates based on characteristics of the out of vocabulary word. At 408, an operation is configured to present the word candidates on a display. At 410, an operation is configured to receive word input data that indicates a selection of one of the word candidates as an intended word for the out of vocabulary word. And at 412, an operation is configured to add the intended word to the repository of words.

Figure 5:
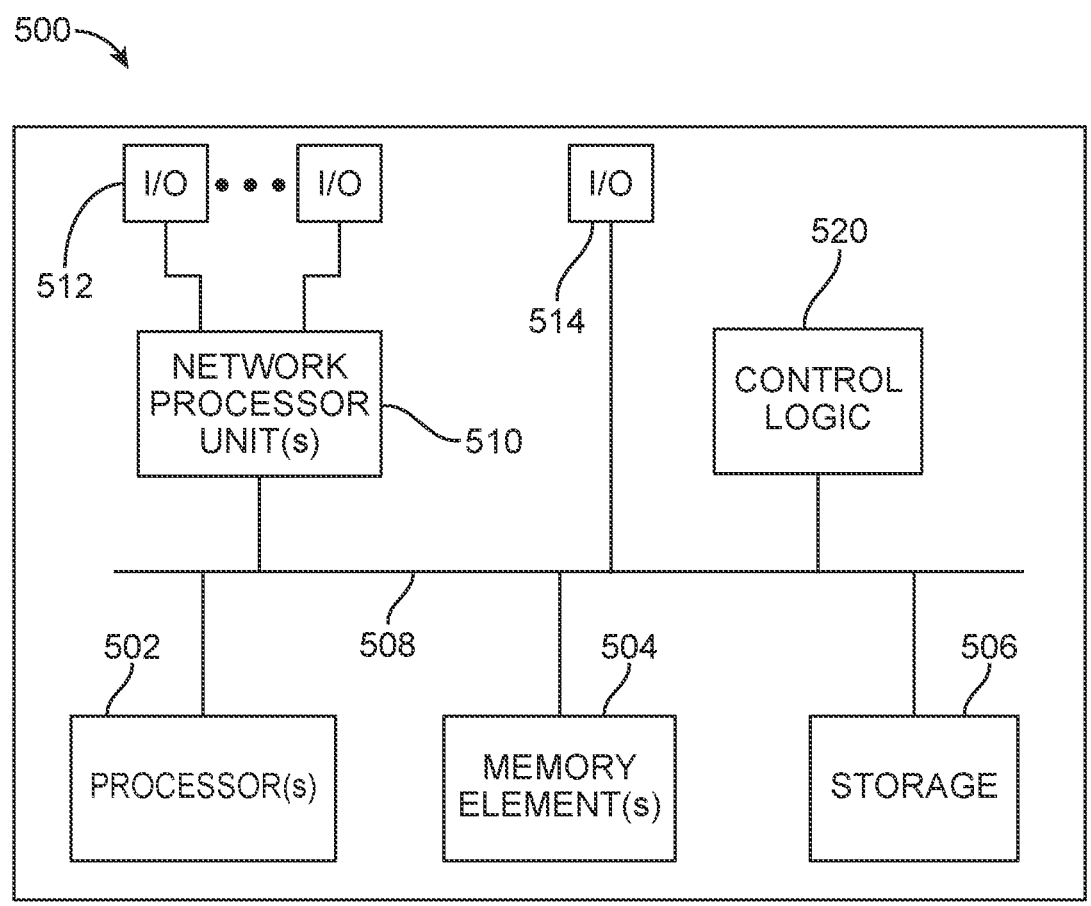
FIG. 5 is a block diagram of a device that may be configured to execute OOV word detection and word candidate generation logic and perform the techniques described herein, according to an example embodiment.

FIG. 5 is a block diagram of a device that may be configured to execute OOV word detection and word candidate generation logic 160 and perform the techniques described herein, according to an example embodiment. A computing device 500 may be configured to perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520 (which could include, for example, OOV word detection and word candidate generation logic 160). In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment, a method is provided. The method may include receiving audio input data including a series of spoken words, determining that one of the spoken words is an out of vocabulary word absent from a repository of words, generating word candidates based on characteristics of the out of vocabulary word, presenting the word candidates on a display, receiving intended word input data that indicates a selection of one of the word candidates as an intended word for the out of vocabulary word, and adding the intended word to the repository of words.

The method may further include generating a transcript using the audio input data, the transcript including an indication of a location of the out of vocabulary word; and displaying the transcript.

Further still, the method may also include receiving the intended word input data; and displaying the intended word at the location.

In one implementation, generating the word candidates includes transforming the out of vocabulary word into a series of phonemes, and transforming the series of phonemes into a plurality of graphemes.

The method may also include inputting the plurality of graphemes into a machine learning model. The machine learning model may be trained using a corpus of text from a domain associated with a subject matter of the audio input data. The method may further include the machine learning model outputting the word candidates.

In yet another implementation, ranking the word candidates may be based on a probability of similarity between each one of the word candidates and the out of vocabulary word given a predetermined context of the series of spoken words.

The ranking the word candidates may be based on a comparison of an approximate pronunciation of the out of vocabulary word and an approximate pronunciation of each of the word candidates.

The ranking the word candidates may be based on an edit distance equal to a number of characters by which each one of the word candidates must be altered by at least one of substitution, deletion, or insertion in order for a given word candidate to have characters identical to the out of vocabulary word.

The ranking the word candidates may be based on a comparison of a number of characters of the out of vocabulary word and a number of characters of each of the word candidates.

A device may also be provided. The device may include an interface configured to enable network communications, a memory, and one or more processors coupled to the interface and the memory, and configured to: receive audio input data including a series of spoken words, determine that one of the spoken words is an out of vocabulary word absent from a repository of words, generate word candidates based on characteristics of the out of vocabulary word, present the word candidates on a display, receive intended word input data that indicates a selection of one of the word candidates as an intended word for the out of vocabulary word, and add the intended word to the repository of words.

The one or more processors of the device may be further configured to: generate a transcript using the audio input data, the transcript including an indication of a location of the out of vocabulary word; and display the transcript.

In one implementation, the one or more processors may be configured to generate the word candidates by transforming the out of vocabulary word into a series of phonemes, and transforming the series of phonemes into a plurality of graphemes.

The one or more processors may further be configured to input the plurality of graphemes into a machine learning model that is trained using a corpus of text from a domain associated with a subject matter of the audio input data. The machine learning model may output the word candidates.

In still another embodiment, one or more non-transitory computer readable storage media are provided and are encoded with instructions that, when executed by a processor, cause the processor to: determine an intended word for an OOV, and add the intended word to a repository of words. When executing the instructions, the processor may receive audio input data including a series of spoken words, determine that one of the spoken words is an out of vocabulary word absent from a repository of words, and generate word candidates based on characteristics of the out of vocabulary word. Additionally, when executing the instructions, the processor may further present the word candidates on a display, receive intended word input data that indicates a selection of one of the word candidates as an intended word for the out of vocabulary word, and add the intended word to the repository of words.

In one embodiment, when the processor executes the instructions, the processor is further configured to: generate a transcript using the audio input data, the transcript including an indication of a location of the out of vocabulary word; and display the transcript.

Further, when the processor is configured to generate the word candidates, the processor may further be configured to: transform the out of vocabulary word into a series of phonemes, and transform the series of phonemes into a plurality of graphemes.

The processor may be configured to generate the word candidates by inputting the plurality of graphemes into a machine learning model, which is trained using a corpus of text from a domain associated with a subject matter of the audio input data and outputting the word candidates.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
receiving audio input data including a series of spoken words;
determining that one of the spoken words is an out of vocabulary word absent from a repository of words;

generating word candidates based on characteristics of the out of vocabulary word;
correcting a spelling of at least one of the word candidates;
ranking the word candidates based on character level N-gram embeddings and based on whether given word candidates begin with a same character as the out of vocabulary word;
presenting the word candidates on a display in a ranked order according to a result of the ranking;
receiving intended word input data that indicates a selection of one of the word candidates as an intended word for the out of vocabulary word; and
adding the intended word to the repository of words.

2. The method according to claim 1, further comprising:
generating a transcript using the audio input data, the transcript including an indication of a location of the out of vocabulary word; and
displaying the transcript.

3. The method according to claim 2, further comprising:
receiving the intended word input data; and
displaying the intended word at the location.

4. The method according to claim 1, wherein generating the word candidates comprises transforming the out of vocabulary word into a series of phonemes, and transforming the series of phonemes into a plurality of graphemes.

5. The method according to claim 4, further comprising inputting the plurality of graphemes into a machine learning model.

6. The method of claim 5, wherein the machine learning model is trained using a corpus of text from a domain associated with a subject matter of the audio input data.

7. The method according to claim 5, further comprising the machine learning model outputting the word candidates.

8. The method of claim 1, further comprising ranking the word candidates based on a probability of similarity between each one of the word candidates and the out of vocabulary word given a predetermined context of the series of spoken words.

9. The method of claim 7, further comprising ranking the word candidates based on a comparison of an approximate pronunciation of the out of vocabulary word and an approximate pronunciation of each of the word candidates.

10. The method of claim 7, further comprising ranking the word candidates based on an edit distance equal to a number of characters by which each one of the word candidates must be altered by at least one of substitution, deletion, or insertion in order for a given word candidate to have characters identical to the out of vocabulary word.

11. The method of claim 7, further comprising ranking the word candidates based on a comparison of a number of characters of the out of vocabulary word and a number of characters of each of the word candidates.

12. A device comprising:
an interface configured to enable network communications;
a memory; and
one or more processors coupled to the interface and the memory, and configured to:
receive audio input data including a series of spoken words;
determine that one of the spoken words is an out of vocabulary word absent from a repository of words;
generate word candidates based on characteristics of the out of vocabulary word;
correct a spelling of at least one of the word candidates;
rank the word candidates based on character level N-gram embeddings to obtain a ranking and based on whether given word candidates begin with a same character as the out of vocabulary word;
present the word candidates on a display in a ranked order according to the ranking;
receive intended word input data that indicates a selection of one of the word candidates as an intended word for the out of vocabulary word; and
add the intended word to the repository of words.

13. The device of claim 12, wherein the one or more processors are further configured to:
generate a transcript using the audio input data, the transcript including an indication of a location of the out of vocabulary word; and
display the transcript.

14. The device of claim 12, wherein the one or more processors being configured to generate the word candidates comprises the one or more processors being configured to:
transform the out of vocabulary word into a series of phonemes, and transform the series of phonemes into a plurality of graphemes.

15. The device of claim 14, wherein the one or more processors are further configured to:
input the plurality of graphemes into a machine learning model that is trained using a corpus of text from a domain associated with a subject matter of the audio input data.

16. The device of claim 15, wherein the machine learning model outputs the word candidates.

17. One or more non-transitory computer readable storage media encoded with instructions that, when executed by a processor, cause the processor to:
receive audio input data including a series of spoken words;
determine that one of the spoken words is an out of vocabulary word absent from a repository of words;
generate word candidates based on characteristics of the out of vocabulary word;
correct a spelling of at least one of the word candidates;
rank the word candidates based on character level N-gram embeddings to obtain a ranking and based on whether given word candidates begin with a same character as the out of vocabulary word;
present the word candidates on a display in a ranked order according to the ranking;
receive intended word input data that indicates a selection of one of the word candidates as an intended word for the out of vocabulary word; and
add the intended word to the repository of words.

18. The one or more non-transitory computer readable storage media of claim 17, wherein when the processor executes the instructions, the processor is further configured to:
generate a transcript using the audio input data, the transcript including an indication of a location of the out of vocabulary word; and
display the transcript.

19. The one or more non-transitory computer readable storage media of claim 17, wherein when the processor is configured to generate the word candidates, the processor is further configured to:
transform the out of vocabulary word into a series of phonemes, and transform the series of phonemes into a plurality of graphemes.

20. The one or more non-transitory computer readable storage media of claim 19, wherein the processor being configured to generate the word candidates comprises the processor being configured to:
   input the plurality of graphemes into a machine learning model, which is trained using a corpus of text from a domain associated with a subject matter of the audio input data, and output the word candidates.

\* \* \* \* \*